UNITED STATES PATENT OFFICE.

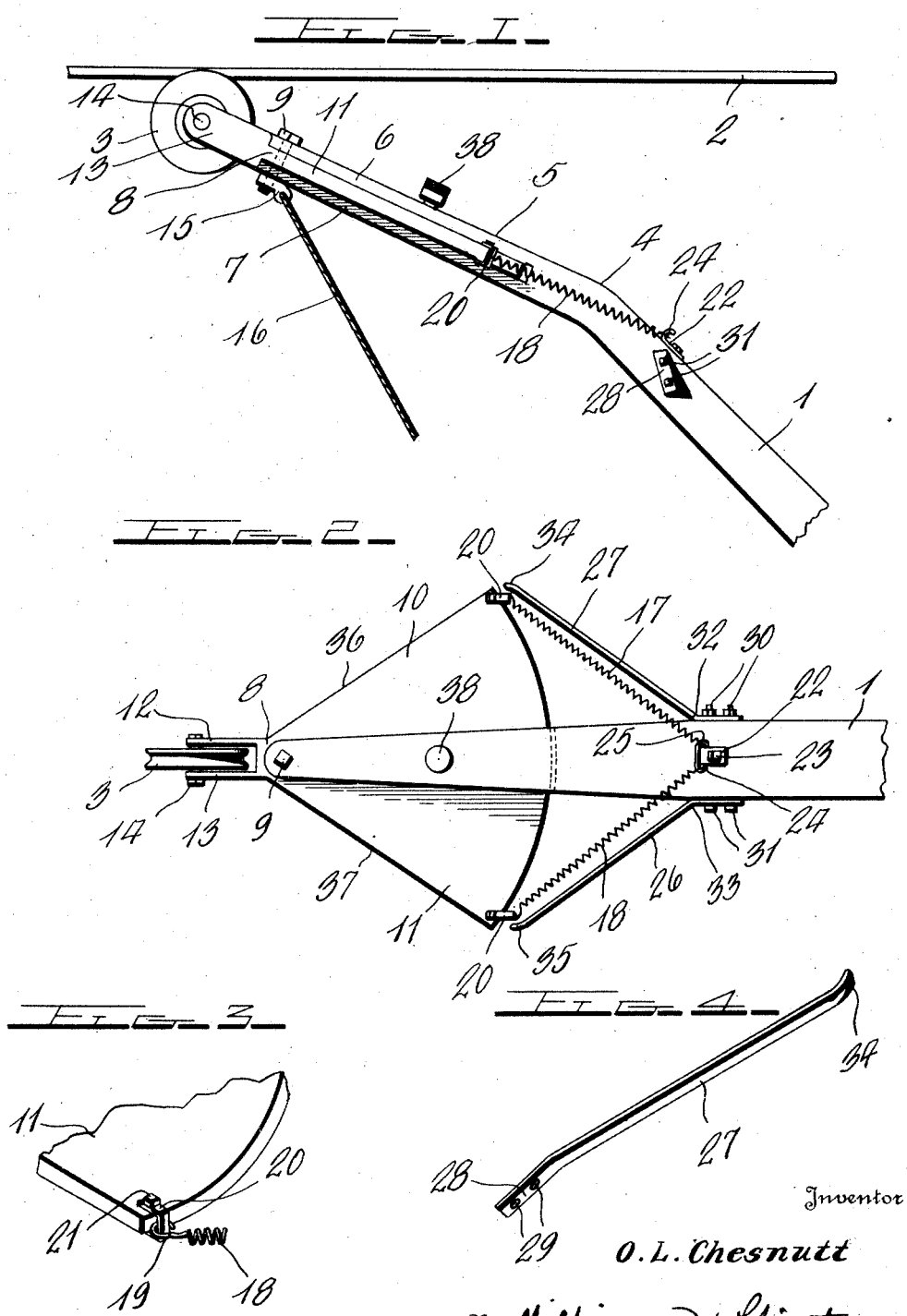

OWEN LEE CHESNUTT, OF ATLANTA, GEORGIA.

SAFETY-TROLLEY.

1,390,885.   Specification of Letters Patent.   Patented Sept. 13, 1921.

Application filed May 9, 1921. Serial No. 467,952.

*To all whom it may concern:*

Be it known that I, OWEN LEE CHESNUTT, a citizen of the United States, residing at Atlanta, in the county of Fulton and State of Georgia, have invented certain new and useful Improvements in Safety-Trolleys; and I hereby declare the following to be a full, clear, and exact description of the invention, such as will enable others skilled in the art to which it appertains to make and use the same.

The present invention relates to improvements in safety trolleys, and has for an object to provide a laterally shiftable trolley wheel so mounted and carried by the trolley pole as to be susceptible of accommodating itself to lateral changes in position of the trolley wire and through lateral changes due to the swinging of the wire or the transverse vibration of the trolley wheel, which conditions occur most frequently incident to the traveling of the car around curves, where the trolley wheel is often caused to "jump" the wire.

This "jumping" of the wheel from the trolley wire causes delays in schedule, damages to the trolley poles, to the guy wires and to other parts of the apparatus, and it creates undesirable noise and is often productive of sparks or arcing which makes it a nuisance to the occupants of homes along the carline or adjacent thereto.

It is another object of the invention to provide a trolley construction having the above advantages which will be simple and inexpensive and compactly arranged so as not to easily get out of order and to be susceptible of ready and cheap repairing.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary view in side elevation of a trolley pole and trolley wire showing the improved device in conjunction therewith;

Fig. 2 is a plan view of the same;

Fig. 3 is a fragmentary perspective view of a corner of one of the sector wings showing the connection of the coil spring therewith; and Fig. 4 is a perspective view of one of the guards.

Referring more particularly to the drawings, 1 designates the usual trolley pole carried by the roof of the car, and 2 represents the trolley wire from which current is conveyed to the car motors through a usual grooved trolley wheel 3 carried by the pole 1. In accordance with the present invention the upper end of the pole 1 is bent, as indicated at 4, at an oblique angle lying more toward the horizontal, and the trolley 3 is carried for lateral movement in the diagonal portion 5 of the trolley pole so that it may have a more horizontally swinging movement than would otherwise occur where the pole 1 is carried up straight at the usual angle. The tip 5 of the pole 1 is bifurcated and provided with forks 6 and 7 spaced vertically one above the other and provided with a transverse space therebetween in which oscillates a sector 8 pivoted as indicated at 9 in the outer ends of the forks 6 and 7 as by a bolt or other suitable fastening, and formed with divergent relatively wide wings 10 and 11 lying below the pivot point 9.

The sector 8 is provided with an extension having bifurcated arms 12 and 13 which receive the trolley wheel 3 and are provided with a bolt or other suitable pivot 14 on which the wheel is free to revolve. The pivot bolt 9 of the sector 8 may also have a lug 15 to which is connected a trolley rope 16 employed for finding the trolley wire 2 and proper positioning the grooved wheel 3 thereon. Coil springs 17 and 18 are connected between the pole and the outer portions of the sector wings 11 and 12. A preferred connection of the spring with the sector wing is shown in Fig. 3, in which the spring 18 is shown to be provided with a hook 19 formed by extending the extremity of the spring and winding it into a substantial circle with an open mouth adapting it to receive the substantially U-shaped clip 20 turning freely on the pivot pin or bolt 21 which passes through from one side to the other of the sector wing 11. The pivotal arrangement of the clip 20 provides for the adjustment and compensation of the parts and adapts the device to changes in the alinement of the spring as the sector pivots on its fulcrum 9. A clip 22 is secured as by a bolt or other suitable means 23 to the pole 1 near the bent portion 4 and carries hooks 24 and 25 to which the other ends of the coil springs 17 and 18 are removably secured. The clip 22 is preferably placed substantially centrally of the pole 1 so that it performs the double function of holding the ends of both springs.

Guards 26 and 27 are provided along the outer sides of the springs 17 and 18 in order to prevent any injury to the springs by reason of their coming in contact with the trolley wire 1 or with the guy wires or other parts of the trolley apparatus. These guards are more particularly shown in Fig. 4 and are provided with angularly turned inner ends 28 having openings 29 therein adapted to receive bolts 30 and 31 for securing the ends 28 flatly against the side portions of the pole 1. The guards are bent outwardly as indicated at 32 and 33 and upwardly in order that they may lie substantially parallel with the springs 17 and 18. The outer extremities of the guards are bent inwardly as indicated at 34 and 35 to provide smooth parts inwardly of the extremities of the wings 10 and 11 in order that the trolley wire slipping along the inclined edges 36 and 37 of the sector wings will not be admitted to the space between the wings and the extremities 34 and 35 of the guards. These extremities 34 and 35 are so curved as to guide the wire on the exterior surfaces of the guards 26 and 27.

A compression grease cup 38 is secured upon the upper fork 6 of the pole and provides for the lubrication of the adjacent parts.

In operation, the grooved wheel 3 will be permitted to follow the trolley wire 2 and to conform to all lateral undulations or offset portions thereof and to accommodate itself to any swinging movement that a portion of the wire 2 may be partaking of at any particular time. All of these slight transverse vibrations are taken up by the diagonal swinging of the sector 8 on the pin 9.

The spring 17 and 18 of course constantly tend to hold the sector and the trolley wheel in an initial intermediate position which is beneath the normal line of the trolley wire 2, and such springs give readily and tend to restore the parts to the original condition after they are once displaced therefrom. The guards 26 and 27 at all times protect the springs 17 and 18 from striking upon objects and from entanglements with the trolley wire and guy wires. Of course further lubrication may be provided wherever necessary and wherever occasion demands.

The most important item in this flexible feature of the safety trolley, from the standpoint of the power company, is its ability to adapt itself to the power line wire while the car is traveling around curves, thus preventing the cutting of the flanges of the trolley wheel against the wire which soon wears it so thin and frail that the removal of the entire curve section is necessary.

At night when the cars are traveling through unlighted portions of the city or interurban sections, the jumping of the trolley puts the car in darkness and subjects all on board to highwaymen who may be ready for such opportunity to pull off their dastardly crime and get off with it before readjustment of trolley can be effected.

It is obvious that various changes and modifications may be made in the details of construction and design of the above specifically described embodiment of this invention without departing from the spirit thereof, such changes and modifications being restricted only by the scope of the following claims.

What is claimed is:—

1. A safety trolley comprising a trolley pole having a bifurcated end, a sector pivoted between the forks of the bifurcated end of said pole and having its wings extending on opposite sides of the pole, resilient means connected at one end to the pole and at the other end to the outer portions of the wings in said sector and acting to normally retain the same in an initial intermediate position, and a trolley wheel carried by said sector, substantially as described.

2. A safety trolley comprising a trolley pole having a bifurcated end with a laterally disposed slot between the forks of the bifurcation, a sector pivoted at the other end of the bifurcated part at its central portion and having its side wings extending outwardly beyond the sides of the pole, springs connected at one end to said pole and at their other ends to the outer portions of the wings of the sector, and a trolley wheel carried by said sector beyond the end of the pole, substantially as described.

3. A safety trolley comprising a pole provided with a bifurcated end, a sector pivoted in the bifurcated end of the pole and having its wings extending to opposite sides of the pole, a trolley wheel carried by said sector, springs connected between the pole and the outer portions of the wings of the sector, and guards carried by the pole and extending alongside of the springs, substantially as described.

4. A safety trolley comprising a pole with a bifurcated end, a sector pivoted to swing laterally in the bifurcated end of the pole, and having wings extending to opposite sides of the pole, coil springs connected between the outer portions of the wings and said pole, guards extending in parallelism close to the springs, a trolley wheel carried by said sector, and lubricating means carried by the pole for greasing the surface of the sector, substantially as described.

OWEN LEE CHESNUTT.